(12) United States Patent
Wang et al.

(10) Patent No.: US 11,397,112 B2
(45) Date of Patent: *Jul. 26, 2022

(54) SYSTEM AND METHOD FOR MONITORING OF GAS TURBINE COMPONENTS WITH INFRARED SYSTEM

(71) Applicant: General Electric Company, Schenectady, NY (US)

(72) Inventors: Guanghua Wang, Clifton Park, NY (US); Jason Edward Dees, Ballston Lake, NY (US); Scott Michael Oppenheimer, Schenectady, NY (US); Naveenan Thiagarajan, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 423 days.

This patent is subject to a terminal disclaimer.

(21) Appl. No.: 15/401,886

(22) Filed: Jan. 9, 2017

(65) Prior Publication Data
US 2018/0195906 A1   Jul. 12, 2018

(51) Int. Cl.
*G03B 13/00* (2021.01)
*G01J 5/04* (2006.01)
(Continued)

(52) U.S. Cl.
CPC ............ *G01J 5/042* (2013.01); *F01D 17/085* (2013.01); *F01D 25/14* (2013.01); *F01D 25/26* (2013.01);
(Continued)

(58) Field of Classification Search
CPC ....... G01N 25/72; G01N 21/88; G01M 11/08; G01M 15/14; F02C 9/00; F02C 7/00
See application file for complete search history.

(56) References Cited

U.S. PATENT DOCUMENTS 6,153,889 A   11/2000 Jones
6,367,969 B1   4/2002 Ringermacher et al.
(Continued)

FOREIGN PATENT DOCUMENTS

CN   201903400 U   7/2011
CN   102782258 B   1/2015

OTHER PUBLICATIONS

Zombo et al., "Advanced nde systems for flexible operation and maintenance of gas turbine components", Siemens Power Generation, Inc., Nov. 28-30, 2006.
(Continued)

*Primary Examiner* — Frank F Huang
(74) *Attorney, Agent, or Firm* — Fitch, Even, Tabin & Flannery LLP

(57) ABSTRACT

An infrared imaging device includes a case, a plurality of electronic components, and a heat transfer structure. The plurality of electronic components is configured to collect data and have a predetermined temperature parameter. The plurality of electronic components is disposed within the case. The heat transfer structure is disposed within the case. The heat transfer structure is configured to conduct heat away from the plurality of electronic components. The heat transfer structure is further configured to regulate a temperature of the electronic components below the predetermined temperature parameter.

18 Claims, 12 Drawing Sheets

(51) Int. Cl.

| | | |
|---|---|---|
| *G01J 5/00* | (2022.01) | |
| *G03B 17/55* | (2021.01) | |
| *H04N 5/232* | (2006.01) | |
| *F01D 25/26* | (2006.01) | |
| *F01D 25/14* | (2006.01) | |
| *F01D 17/08* | (2006.01) | |
| *H04N 5/225* | (2006.01) | |
| *G01J 5/061* | (2022.01) | |
| *H04N 5/33* | (2006.01) | |

(52) U.S. Cl.
CPC ........... *G01J 5/0014* (2013.01); *G01J 5/0088* (2013.01); *G01J 5/046* (2013.01); *G01J 5/061* (2013.01); *G03B 17/55* (2013.01); *H04N 5/22521* (2018.08); *H04N 5/23206* (2013.01); *H04N 5/33* (2013.01); *G01J 2005/0077* (2013.01); *Y02T 50/60* (2013.01)

(56) References Cited

U.S. PATENT DOCUMENTS

| | | |
|---|---|---|
| 6,414,458 B1 | 7/2002 | Hatley et al. |
| 6,517,236 B2 | 2/2003 | Sun et al. |
| 6,570,175 B2 | 5/2003 | Bales et al. |
| 6,701,714 B2 * | 3/2004 | Burd .................. F23M 5/02 60/752 |
| 6,796,709 B2 | 9/2004 | Choi |
| 7,388,204 B2 | 6/2008 | Key et al. |
| 7,422,365 B2 * | 9/2008 | Chamberlain ............ G01J 5/10 250/338.1 |
| 7,432,505 B2 | 10/2008 | Brummel |
| 7,619,728 B2 | 11/2009 | Ogburn et al. |
| 8,184,151 B2 | 5/2012 | Zombo et al. |
| 8,431,917 B2 | 4/2013 | Wang et al. |
| 8,749,629 B2 | 6/2014 | Baleine et al. |
| 8,790,006 B2 | 7/2014 | Li et al. |
| 8,961,007 B2 | 2/2015 | Subramanian et al. |
| 9,058,520 B2 | 6/2015 | Xie et al. |
| 9,255,526 B2 * | 2/2016 | Hatcher, Jr. ............... F02C 7/00 |
| 9,310,312 B2 | 4/2016 | Jahnke et al. |
| 9,335,215 B2 | 5/2016 | Wang et al. |
| 9,476,798 B2 | 10/2016 | Pandey et al. |
| 2003/0128736 A1 | 7/2003 | Dalio et al. |
| 2015/0241308 A1 | 8/2015 | Pandey et al. |
| 2016/0212360 A1 | 7/2016 | Williams et al. |

OTHER PUBLICATIONS

Shawal Jadin et al., "Gas Leakage Detection Using Thermal Imaging Technique", Computer Modelling and Simulation (UKSim), 2014 UKSim—AMSS 16th International Conference on, pp. 302-306, Mar. 26-28, 2014, Cambridge.

Douglas J et al., "An integrated approach to the application of high bandwidth optical pyrometry to turbine blade surface temperature mapping", Instrumentation in Aerospace Simulation Facilities, 1999. ICIASF 99. 18th International Congress on, p. 4/1-4/6, 1999, Toulouse.

* cited by examiner

SYSTEM AND METHOD FOR MONITORING OF GAS TURBINE COMPONENTS WITH INFRARED SYSTEM

BACKGROUND

The field of the disclosure relates generally to turbomachinery inspection equipment and, more specifically, to systems for imaging turbomachinery.

In at least some known gas turbine engines, air is pressurized in a compressor and mixed with fuel in a combustor for generating a stream of high-temperature combustion gases. These high-temperature combustion gasses create a hostile environment within the gas turbine engine, which may cause wear and tear for components within the gas turbine engine. At least some known gas turbine engines include an inner case and an outer case defining an undercowl therebetween. Electronic components in the undercowl are not in direct contact with the high-temperature combustion gases. However, the high-temperature combustion gases radiate heat to the electronic components within the undercowl. In some cases, the heat radiated from the high-temperature combustion gases raises the temperature of the electronic components above the electronic component's rated operating temperature.

Typically, gas turbine engines require inspections of the components within the gas turbine engine. Inspection systems, including inspection equipment, are typically used to inspected gas turbine engines. However, the hostile environment within the gas turbine engine can decrease the service life of the inspection equipment. To mitigate the impact of the hostile environment on inspection equipment, inspection systems typically include substantial support systems including, but not limited to, cooling systems, data collection systems, and wiring systems. Inspection systems with substantial support systems may require extended periods of down time for the gas turbine engine to install the inspection systems. Additionally, the inspection systems may also require substantial capital investment to acquire and install the inspections systems. Finally, inspection systems within the undercowl may require cooling systems to operate in the undercowl.

BRIEF DESCRIPTION

In one aspect, an infrared imaging device is provided. The infrared imaging device includes a case, a plurality of electronic components, and a heat transfer structure. The plurality of electronic components is configured to collect data and have a predetermined temperature parameter. The plurality of electronic components is disposed within the case. The heat transfer structure is disposed within the case. The heat transfer structure is configured to conduct heat away from the plurality of electronic components. The heat transfer structure is further configured to regulate a temperature of the electronic components below the predetermined temperature parameter.

In another aspect, an engine is provided. The engine includes a first casing, a second casing, and an infrared imaging device. The second casing circumscribes the first casing. The second casing defines at least one port. The first casing and the second casing defines an undercowl cavity. The infrared imaging device is positioned within the at least one port and configured to collect data from the undercowl cavity. The infrared imaging device includes a case, a plurality of electronic components, and a heat transfer structure. The plurality of electronic components is configured to collect data and have a predetermined temperature parameter. The plurality of electronic components is disposed within the case. The heat transfer structure is disposed within the case. The heat transfer structure is configured to conduct heat away from the plurality of electronic components. The heat transfer structure is further configured to regulate a temperature of the electronic components below the predetermined temperature parameter.

In still another aspect, an engine is provided. The engine includes a first casing, a second casing, and a network of infrared imaging devices. The second casing circumscribes the first casing. The second casing defines a plurality of ports. The first casing and the second casing defines an undercowl cavity. The network of infrared imaging devices includes a plurality of infrared imaging devices. The plurality of infrared devices is coupled in data transfer communication forming the network of infrared imaging devices. Each infrared imaging device is positioned within the plurality of ports and configured to collect data from the undercowl cavity. The infrared imaging device includes a case, a plurality of electronic components, and a heat transfer structure. The plurality of electronic components is configured to collect data and have a predetermined temperature parameter. The plurality of electronic components is disposed within the case. The heat transfer structure is disposed within the case. The heat transfer structure is configured to conduct heat away from the plurality of electronic components. The heat transfer structure is further configured to regulate a temperature of the electronic components below the predetermined temperature parameter.

DRAWINGS

These and other features, aspects, and advantages of the present disclosure will become better understood when the following detailed description is read with reference to the accompanying drawings in which like characters represent like parts throughout the drawings, wherein.

Figure 1:
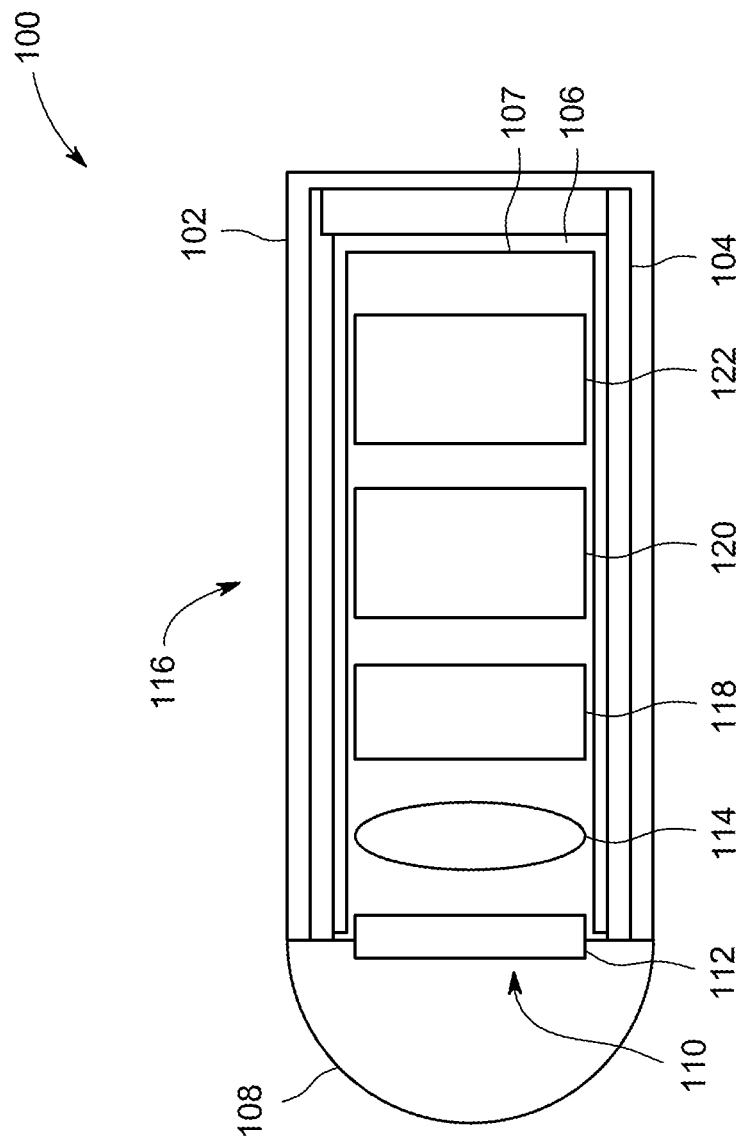
FIG. 1 is a schematic view of an exemplary infrared imaging device.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about the longitudinal axis of the gas turbine engine.

Embodiments of the present disclosure relate to systems for imaging turbomachinery. Specifically, in the exemplary embodiment, the infrared imaging device includes electronic components encased within a phase change material (PCM) and a heat transfer structure. The electronic components record thermal images within a hostile environment with high temperatures which could decrease the service life of the electronic components. The PCM and the heat transfer structure protect the electronic components by absorbing heat from the hostile environment. In the exemplary embodiment, the heat absorbed from the hostile environment raises the temperature of the PCM until the temperature of the PCM reaches the PCM melting temperature. Once the PCM melting temperature has been reached, the temperature of the PCM remains constant until all of the PCM has melted. The PCM extends the useful life of the electronic components by maintaining the temperature of the electronic components below the rated operating temperature of the electronic components while absorbing heat from the hostile environment for a set amount of time. The heat transfer structure embedded within the PCM volume evenly distributes heat within the PCM for uniform melting and heat absorption within the PCM. In another embodiment, the heat transfer structure removes heat from the electronic components without the PCM. In yet another embodiment, multiple infrared imaging devices are coupled in a network to image the entire undercowl of a gas turbine engine. The infrared imaging device of the present disclosure allows for thermal imaging of the hostile environment without prolonged downtime of the turbomachinery housing the hostile environment. As such, the infrared imaging device of the present disclosure provides a more cost effective method to thermally image a turbomachine.

FIG. 1 is a schematic view of an exemplary infrared imaging device 100. Infrared imaging device 100 includes a casing 102 and an insulation material 104 positioned within casing 102. A phase change material (PCM) 106 is positioned within insulation material 104. PCM 106 includes a heat transfer structure 107. An optical dome 108 is coupled to an open end 110 of casing 102. A filter 112 is positioned within open end 110 of casing 102 and a lens 114 is positioned behind filter 112 within PCM 106. Infrared imaging device 100 also includes a plurality of electronic components 116 positioned within PCM 106 and behind lens 114. In the exemplary embodiment, electronic components 116 include an infrared sensor 118, a battery 120, and a communication module 122.

Figure 11:
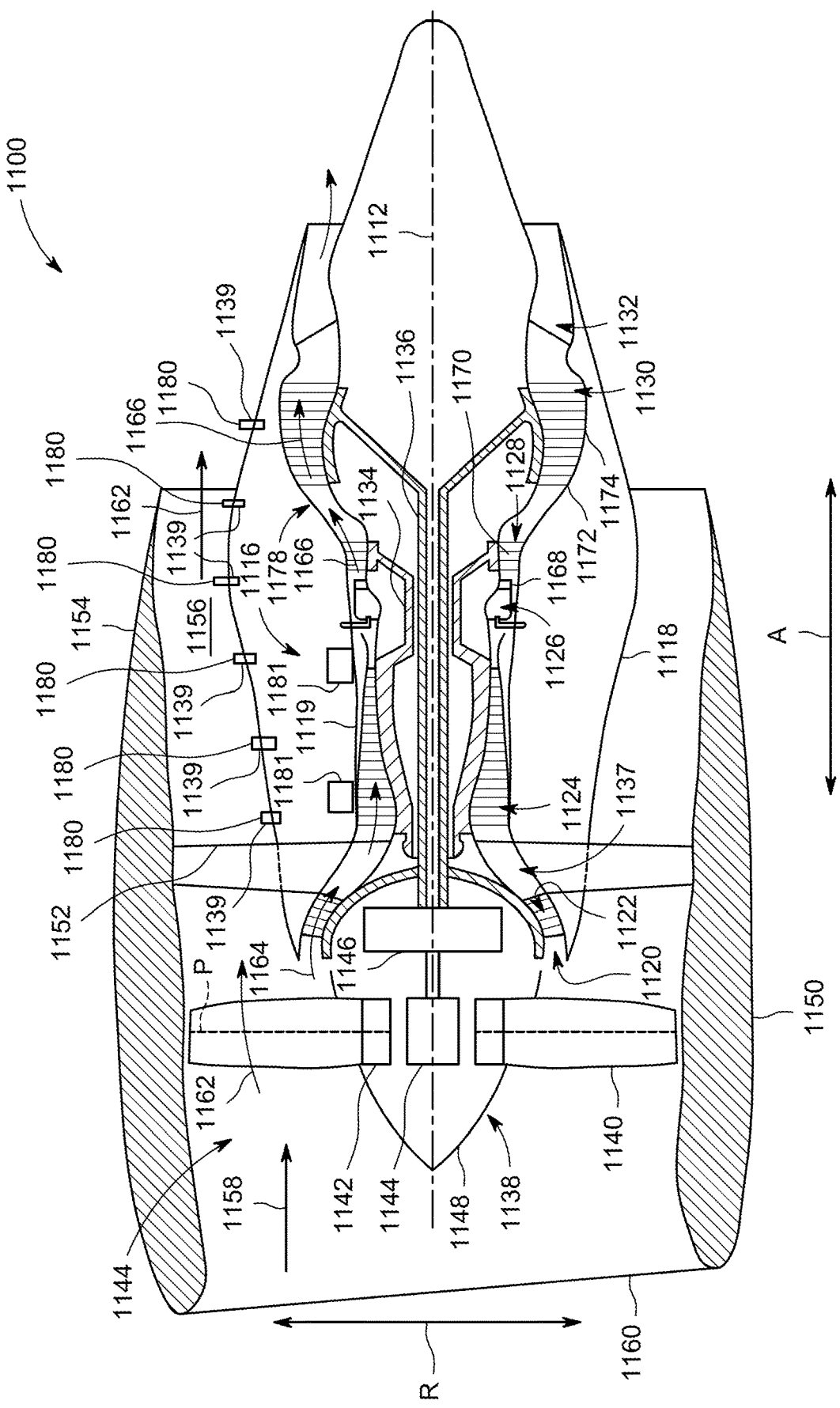
FIG. 11 is a schematic view of an exemplary rotary machine with the infrared imaging device of FIGS. 1, 2, and 3.

During operation, infrared imaging device 100 collects data from a hot gas path 1178 (see FIG. 11). Specifically, infrared imaging device 100 records and transmits infrared image data from hot gas path 1178 by entering hot gas path 1178. Elements within hot gas path 1178 emit thermal radiation. Thermal radiation enters optical dome 108 and travels through filter 112 and lens 114 to infrared sensor 118. Optical dome 108 protects filter 112 and lens 114 from hot gas path 1178. Filter 112 filters or blocks visible light while allowing infrared radiation to pass through to lens 114. Lens 114 focuses infrared radiation to infrared sensor 118, which detects and converts infrared radiation into a visible image. Battery 120 provides power to infrared sensor 118 and a communication module 122. In the exemplary embodiment, communication module 122 is a wireless communication device configured to wirelessly transmit data from infrared sensor 118. Alternatively, communications module 122 is any communications device which enables infrared imaging device 100 to operate as described herein. In the exemplary embodiment, a mass of infrared imagining device 100 includes values in a range from and including about 10 grams (g) to and including about 250 g. In another embodiment, the mass of infrared imagining device 100 is less than about 250 g.

Figure 2:
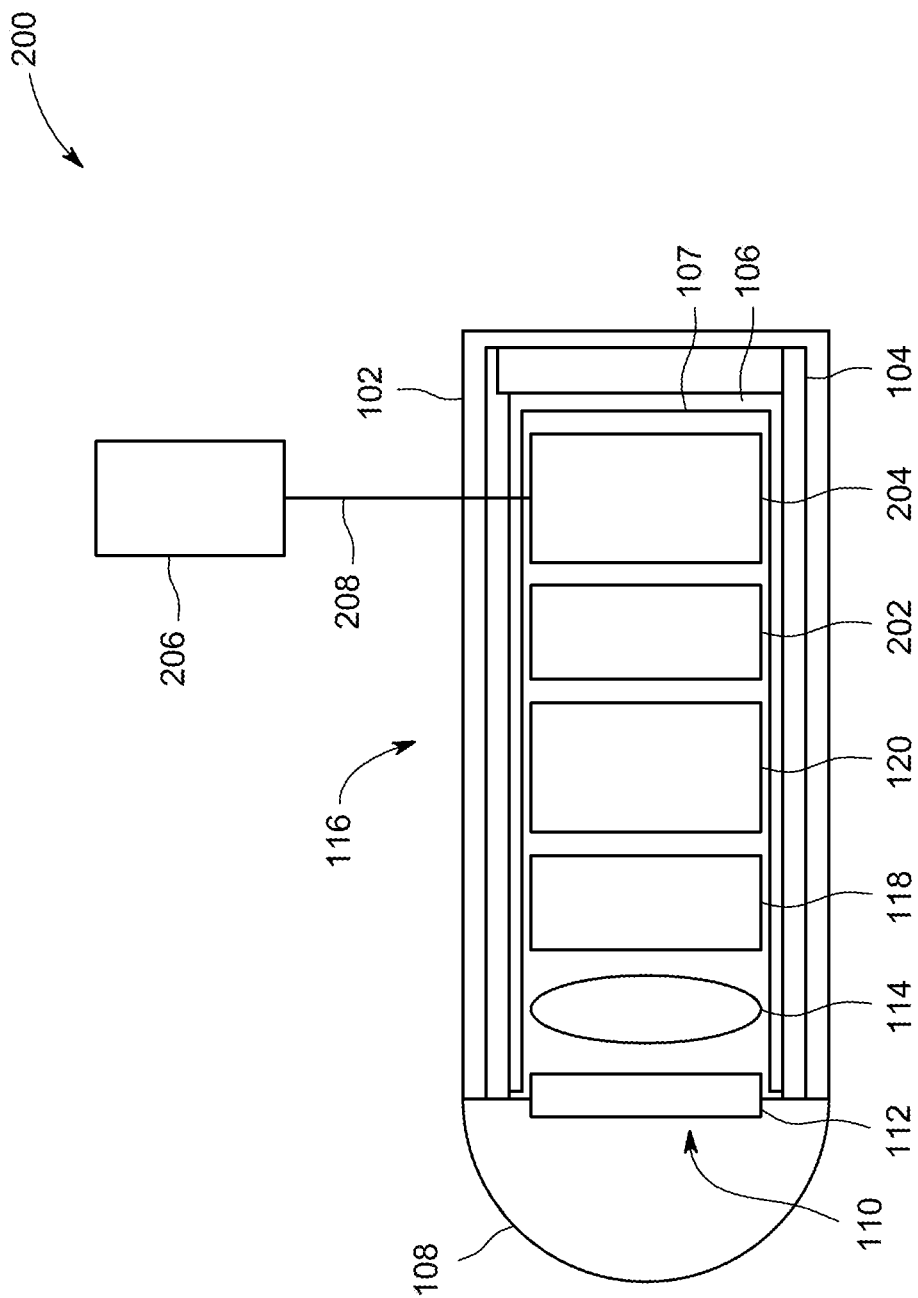
FIG. 2 is a schematic view of an alternative infrared imaging device.

FIG. 2 is a schematic view of an exemplary infrared imaging device 200. Electronic components 116 within infrared imaging device 200 include a data storage module 202 and a communications module 204. Rather than transmitting data from infrared sensor 118 wirelessly, communications module 204 is coupled in data transfer communication with a data collection module 206 by a data transfer device 208. In the exemplary embodiment, data collection module 206 is a laptop computer. However, data collection module 206 may be any computing device which enables infrared imaging device 200 to operate as described herein. In the exemplary embodiment, data transfer device 208 is a data transfer wire. However, data transfer device 208 may be any wire which enables infrared imaging device 200 to operate as described herein.

Figure 3:
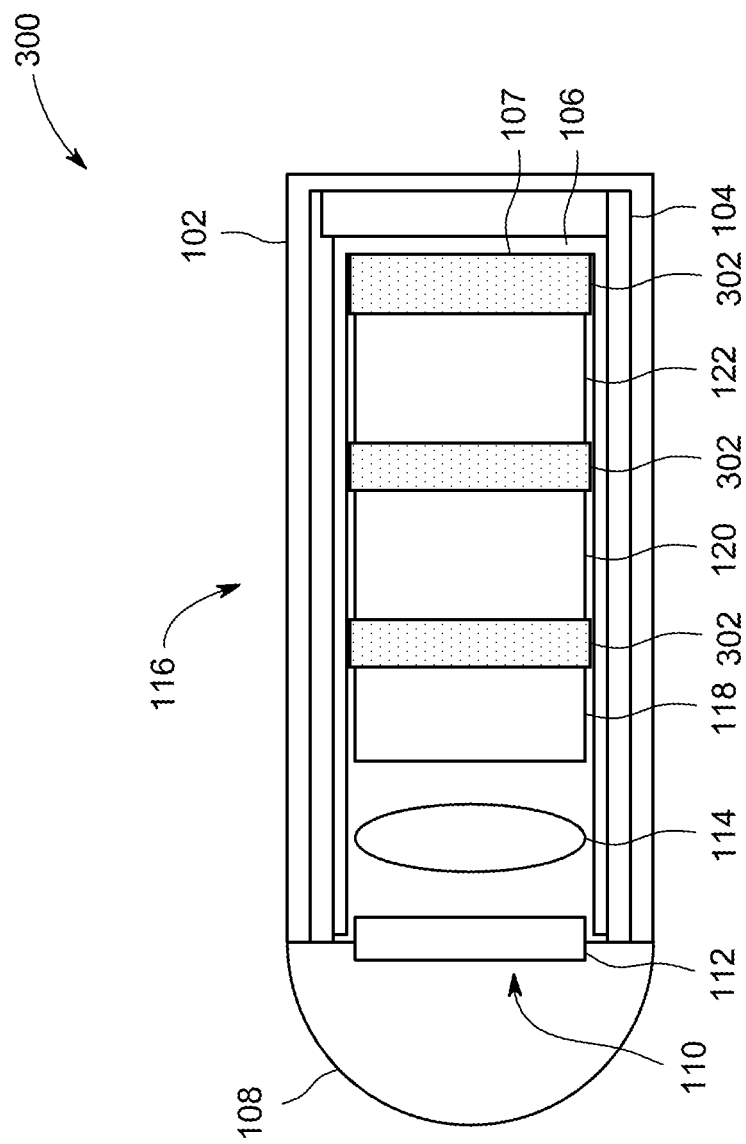
FIG. 3 is a schematic view of an alternative infrared imaging device.

FIG. 3 is a schematic view of an exemplary infrared imaging device 300. In the exemplary embodiment, a phase change material (PCM) 302 extends between electronic components 116. Extending PCM 302 between electronic components 116 increases the amount of phase change material 106 and 302 within infrared imaging device 300 and increases the amount of heat that PCM 106 and 302 absorbs.

Electronic components 116 have a rated operating temperature. In the exemplary embodiment, the rated operating temperature of electronic components 116 includes values in a range from and including about 25° C. (77° F.) to and including about 150° C. (302° F.). In another embodiment, the safe operating temperature of electronic components 116 includes values in a range from and including about 25° C. (77° F.) to and including about 80° C. (176° F.). In yet another embodiment, the safe operating temperature of electronic components 116 is about 80° C. (176° F.). However, the rated operating temperature of electronic components 116 includes any temperature which enables infrared imaging device 100 to operate as described herein. If the temperature of electronic components 116 exceeds the rated operating temperature, electronic components 116 will fail and cease to collect data. Typically, hot gas path 1178 includes temperatures which exceed the rated operating temperature of electronic components 116. As shown in FIG. 3, casing 102, insulation material 104, and PCM 106 provide thermal protection for electronic components 116 for a limited amount of time. In the exemplary embodiment, insulation material 104 includes fiberglass insulation, ceramic insulation, or microporous insulation. However, insulation material 104 may include any insulation material which enables infrared imaging device 100 to operate as described herein.

PCM 106 has a PCM melting temperature that is lower than the rated operating temperature of electronic components 116. Additionally, PCM 106 has a PCM heat of fusion which is defined as the heat absorbed per unit of mass of PCM 106, at the PCM melting temperature, which converts most, if not all, of PCM 106 from a solid to a liquid. During operation, PCM 106 protects electronic components 116 by absorbing heat from hot gas path 1178. The heat absorbed from hot gas path 1178 raises the temperature of PCM 106 until the temperature of PCM 106 reaches the PCM melting temperature. Once the PCM melting temperature has been reached, the temperature of PCM 106 remains constant near isothermal (meaning the temperature of PCM 106 is not constant, but remains substantially constant) until all of PCM 106 has melted. That is, the temperature of PCM 106 remains constant until PCM 106 has absorbed an amount of heat from hot gas path 1178 equal to the PCM heat of fusion multiplied by the mass of PCM 106. PCM 106 extends the useful life of electronic components 116 by maintaining the temperature of electronic components 116 below the rated operating temperature of electronic components 116 while absorbing heat from hot gas path 1178 for a set amount of time 302 and 306 (see FIG. 3).

Figure 4:
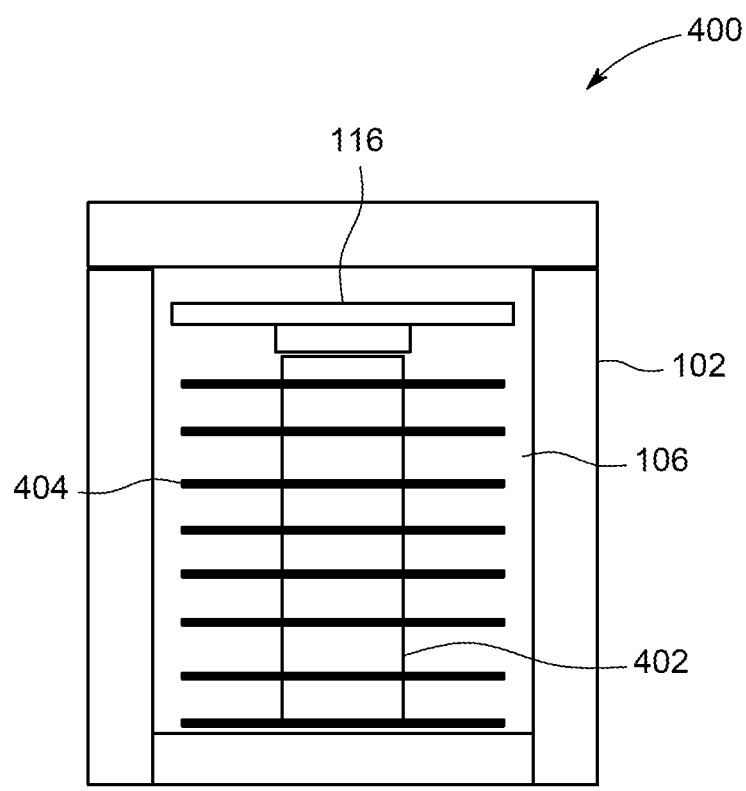
FIG. 4 is a schematic view of an exemplary heat transfer structure within the infrared imaging device of FIGS. 1, 2, and 3.

FIG. 4 is a schematic view of an exemplary heat transfer structure 400. In the exemplary embodiment, heat transfer structure 400 includes a fin structure including a heat pipe 402 and a plurality of fins 404 extending from heat pipe 402. Heat pipe 402 and fins 404 are disposed within PCM 106. Heat pipe 402 supports fins 404 within PCM 106. In the exemplary embodiment, heat pipe 402 is coupled in heat transfer communication with case 102 and electronic components 116. Heat pipe 402 conducts heat from case 102 and electronic components 116 and directs heat to fins 404 which direct heat into PCM 106. Fins 404 evenly distribute heat within PCM 106 preventing temperature spikes within PCM 106 and electronic components 116 while PCM 106 is melting. Heat transfer structure 400 promotes uniform phase change by reducing the heat conduction distance through PCM 106 to half the spacing between fins 404. In the exemplary embodiment, heat pipe 402 includes an elongated heat conductor. However, heat pipe 402 includes any heat conductor in any geometry.

Figure 5:
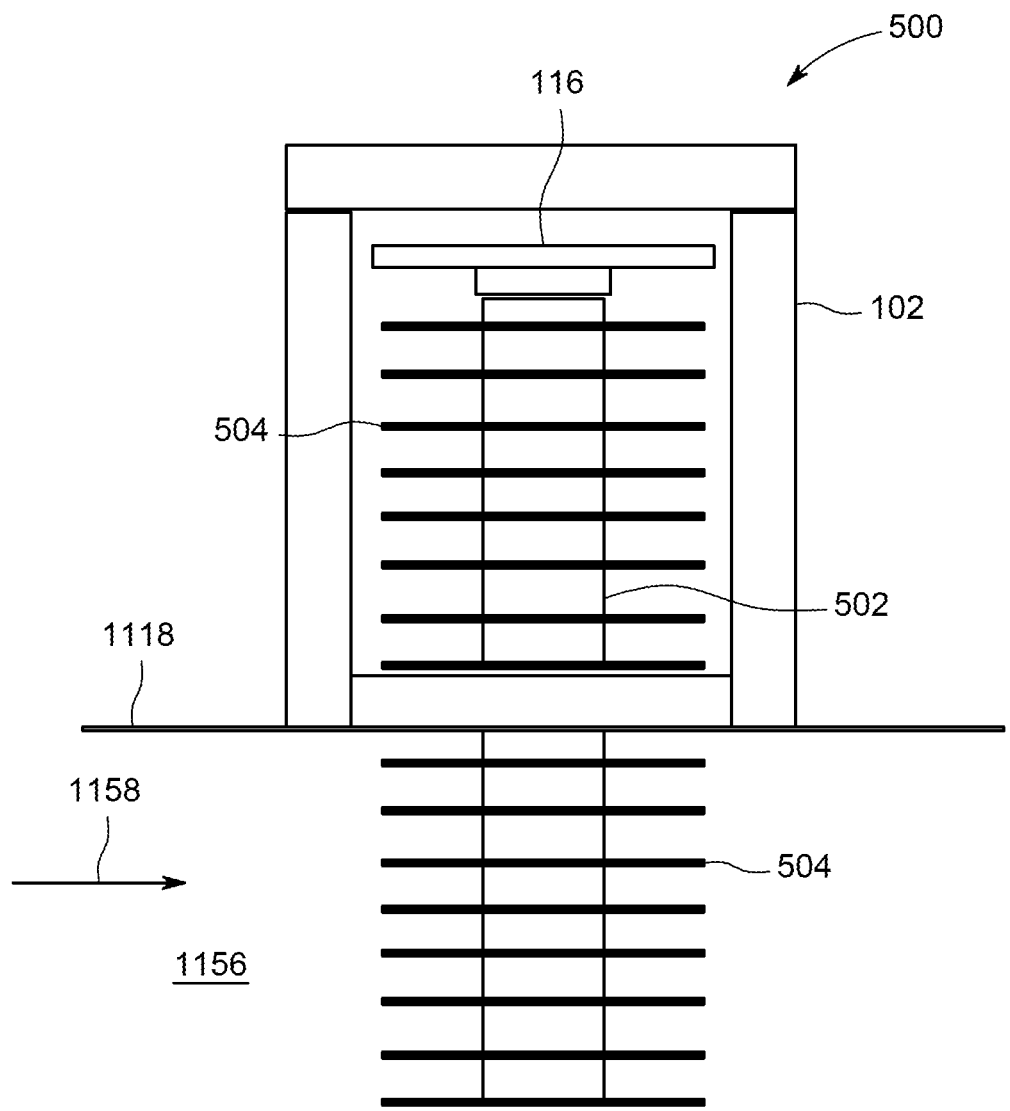
FIG. 5 is a schematic view of another exemplary heat transfer structure within the infrared imaging device of FIGS. 1, 2, and 3.

FIG. 5 is a schematic view of an exemplary heat transfer structure 500. In the exemplary embodiment, heat transfer structure 500 includes a fin structure including a heat pipe 502 and a plurality of fins 504 extending from heat pipe 502. Heat pipe 502 extends through case 102 and outer casing 1118 (see FIG. 11) into bypass airflow passage 1156 (see FIG. 11). In the exemplary embodiment, heat pipe 502 is coupled in heat transfer communication with case 102 and electronic components 116. Heat pipe 502 conducts heat from case 102 and electronic components 116 and directs heat to fins 504 which direct heat into first portion of air 1158 (see FIG. 11) within bypass airflow passage 1156. Fins 504 transfers heat into first portion of air 1158 preventing temperature spikes within electronic components 116. In another embodiment, heat transfer structure 500 includes PCM 106. Fins 504 conduct heat to PCM 106. In the exemplary embodiment, heat pipe 502 includes an elongated heat conductor. However, heat pipe 502 includes any heat conductor in any geometry.

Figure 6:
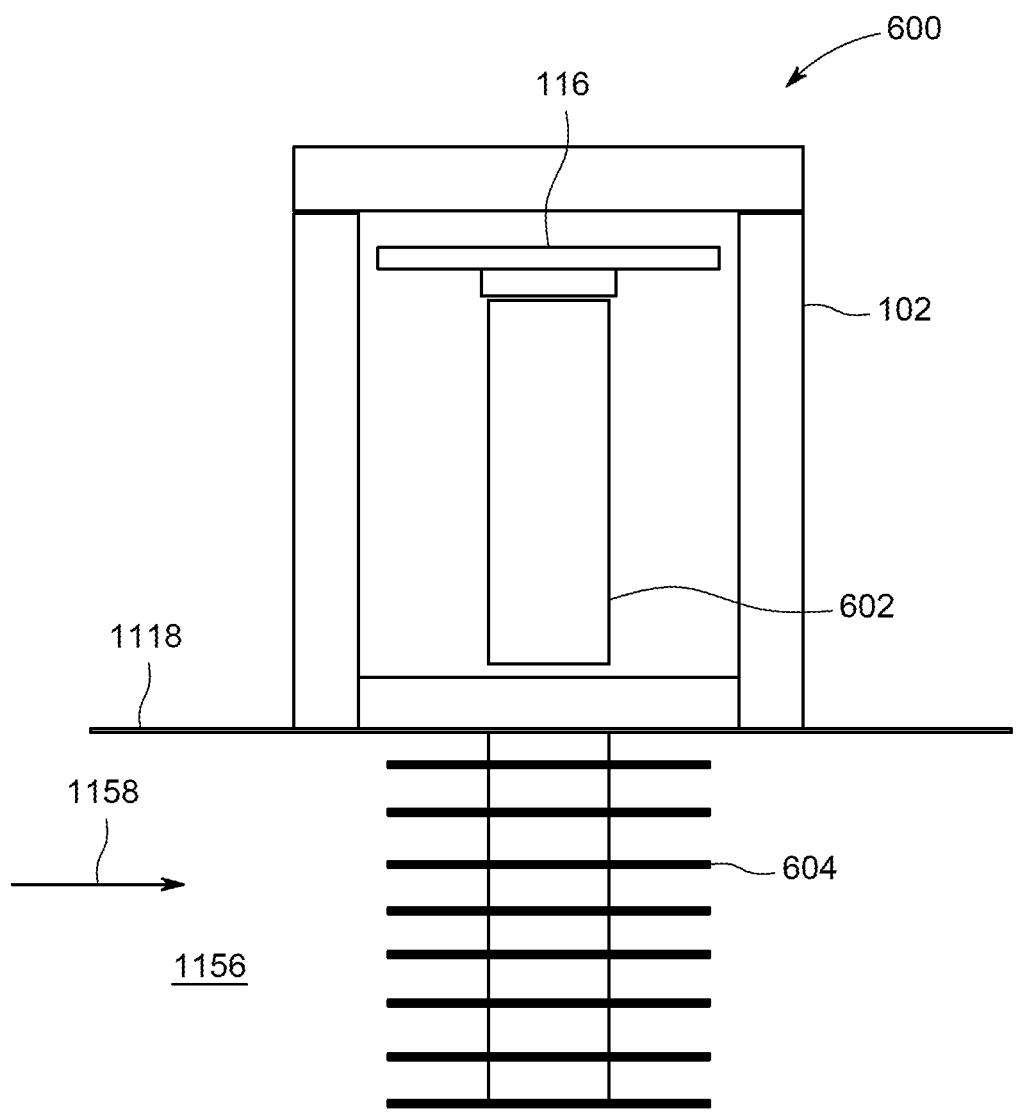
FIG. 6 is a schematic view of another exemplary heat transfer structure within the infrared imaging device of FIGS. 1, 2, and 3.

FIG. 6 is a schematic view of an exemplary heat transfer structure 600. In the exemplary embodiment, heat transfer structure 600 includes a fin structure including a heat pipe 602 and a plurality of fins 604 extending from heat pipe 602. Heat pipe 602 extends through case 102 and outer casing 1118 (see FIG. 11) into bypass airflow passage 1156 (see FIG. 11). In the exemplary embodiment, fins 604 extend from heat pipe 602 only in bypass airflow passage 1156. Heat pipe 602 is coupled in heat transfer communication with case 102 and electronic components 116. Heat pipe 602 conducts heat from case 102 and electronic components 116 and directs heat to fins 604 which direct heat into first portion of air 1158 (see FIG. 11) within bypass airflow passage 1156. Fins 604 transfers heat into first portion of air 1158 preventing temperature spikes within electronic components 116. In the exemplary embodiment, heat pipe 602 includes an elongated heat conductor. However, heat pipe 602 includes any heat conductor in any geometry.

Figure 7:
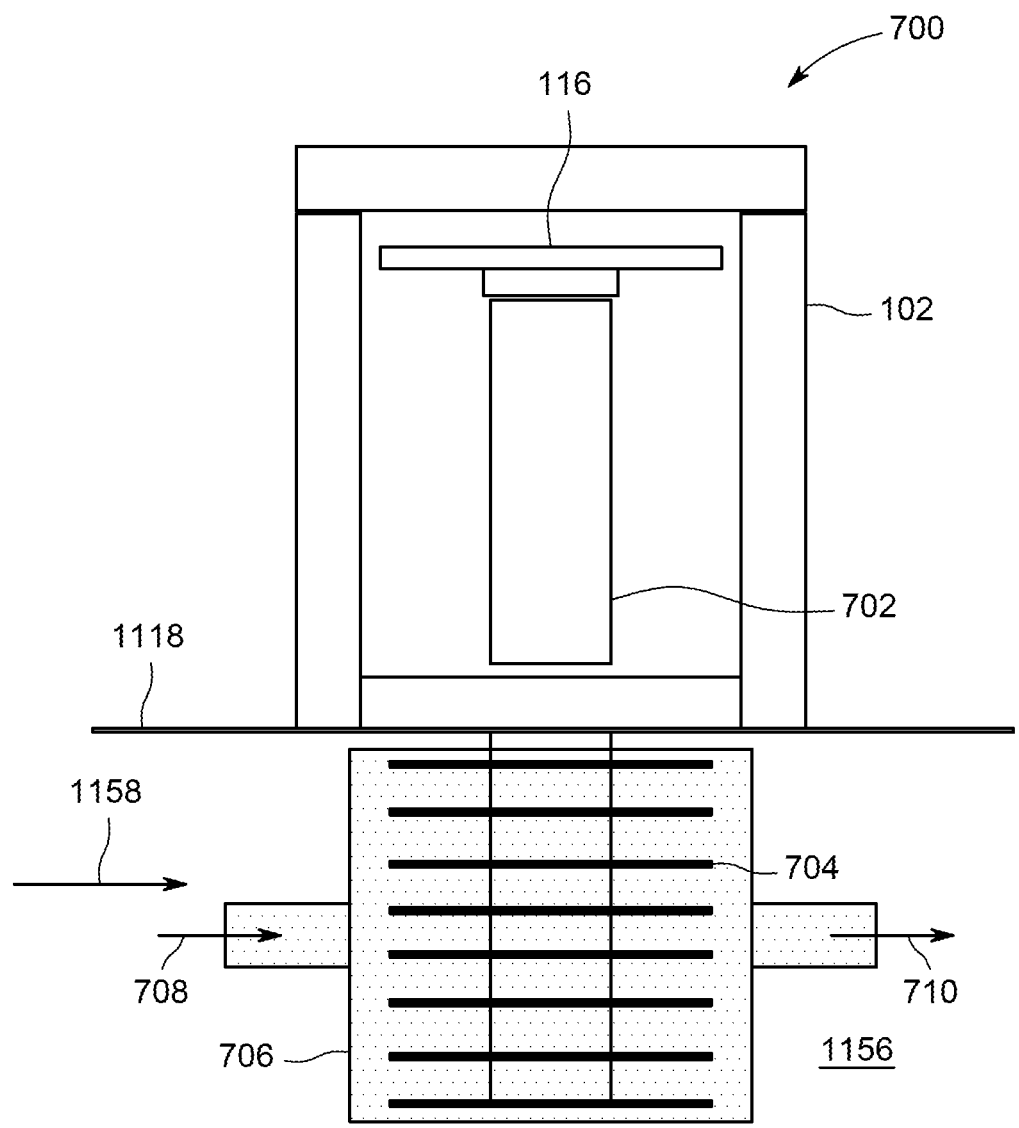
FIG. 7 is a schematic view of another exemplary heat transfer structure within the infrared imaging device of FIGS. 1, 2, and 3.

FIG. 7 is a schematic view of an exemplary heat transfer structure 700. In the exemplary embodiment, heat transfer structure 700 includes a fin structure including a heat pipe 702 and a plurality of fins 704 extending from heat pipe 702. Heat pipe 702 extends through case 102 and outer casing 1118 (see FIG. 11) into bypass airflow passage 1156 (see FIG. 11). In the exemplary embodiment, fins 704 extend from heat pipe 702 only in bypass airflow passage 1156. Heat pipe 702 is coupled in heat transfer communication with case 102 and electronic components 116. In the exemplary embodiment, heat pipe 702 includes an elongated heat conductor. However, heat pipe 702 includes any heat conductor in any geometry.

Figure 8:
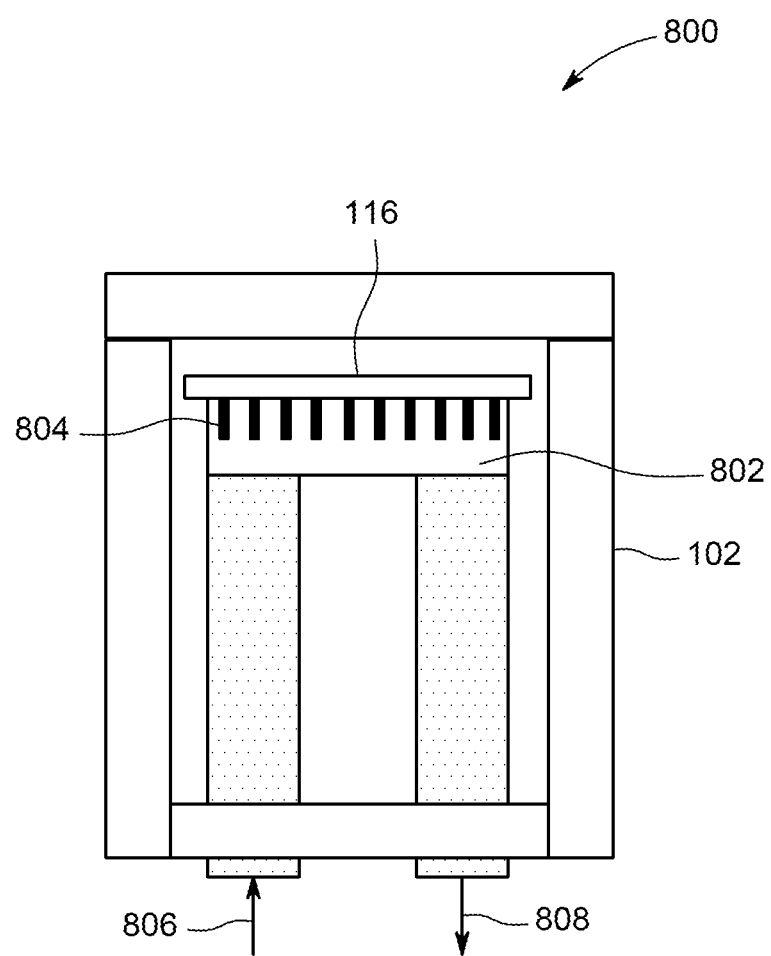
FIG. 8 is a schematic view of another exemplary heat transfer structure within the infrared imaging device of FIGS. 1, 2, and 3.

In the exemplary embodiment, heat transfer structure 700 also includes a cooler 706. Heat pipe 702 and fins 704 extend into cooler 706. Cooler 706 cools heat pipe 702 and fins 704 with a cooling fluid. In the exemplary embodiment, the cooling fluid is fuel. However, the cooling fluid may be any fluid that enables cooler 706 to operate as described herein. The cooling fluid enters cooler 706 through an inlet 708 and exits cooler 706 through an outlet 710. Heat pipe 702 conducts heat from case 102 and electronic components 116 and directs heat to fins 704 which direct heat into the cooling fluid FIG. 8 is a schematic view of an exemplary heat transfer structure 800. In the exemplary embodiment, heat transfer structure 800 includes a cooler 802 coupled in heat transfer communication with electronic components 116. A plurality of fins 804 are coupled to electronic components 116 and extend into cooler 802. Cooler 802 cools fins 804 with a cooling fluid. In the exemplary embodiment, the cooling fluid is fuel. However, the cooling fluid may be any fluid that enables cooler 802 to operate as described herein. The cooling fluid enters cooler 802 through an inlet 806 and exits cooler 802 through an outlet 808. Fins 804 conduct heat from electronic components 116 and directs the heat into the cooling fluid, preventing temperature spikes within electronic components 116.

Figure 9:
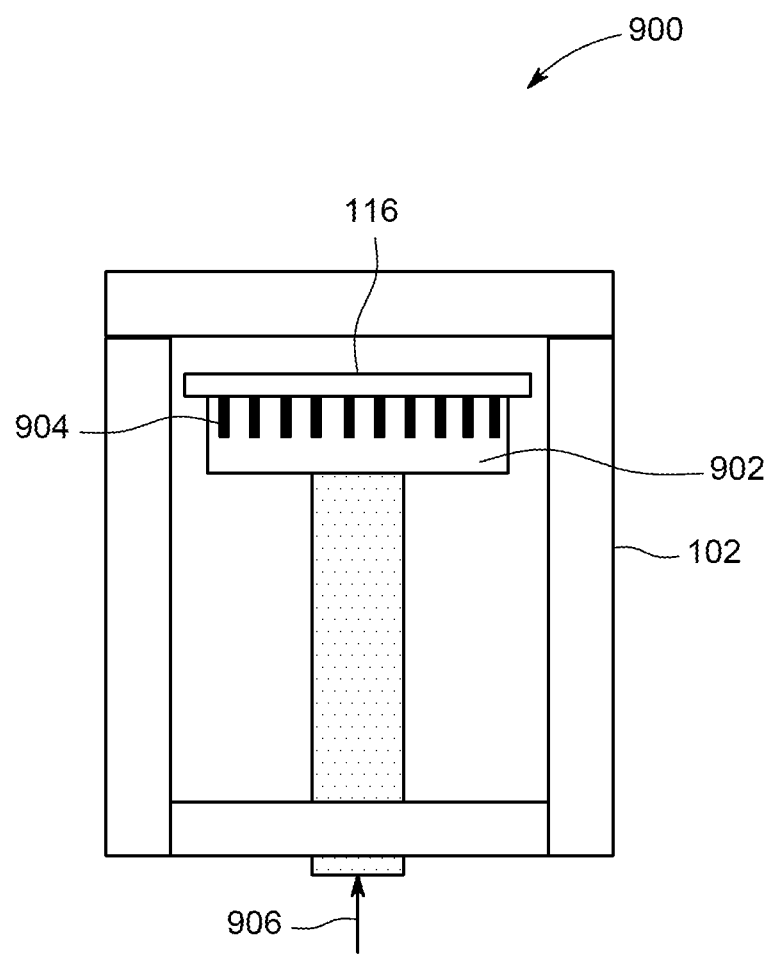
FIG. 9 is a schematic view of another exemplary heat transfer structure within the infrared imaging device of FIGS. 1, 2, and 3.

FIG. 9 is a schematic view of an exemplary heat transfer structure 900. In the exemplary embodiment, heat transfer structure 900 includes a cooler 902 coupled in heat transfer communication with electronic components 116. A plurality of fins 904 are coupled to electronic components 116 and extend into cooler 902. Cooler 902 cools fins 904 with a cooling fluid. In the exemplary embodiment, the cooling fluid is fuel. However, the cooling fluid may be any fluid that enables cooler 902 to operate as described herein. The cooling fluid enters cooler 902 through a nozzle 906. Nozzle 906 sprays the cooling fluid onto fins 904. Fins 904 conduct heat from electronic components 116 and directs the heat into the cooling fluid, preventing temperature spikes within electronic components 116.

Figure 10:
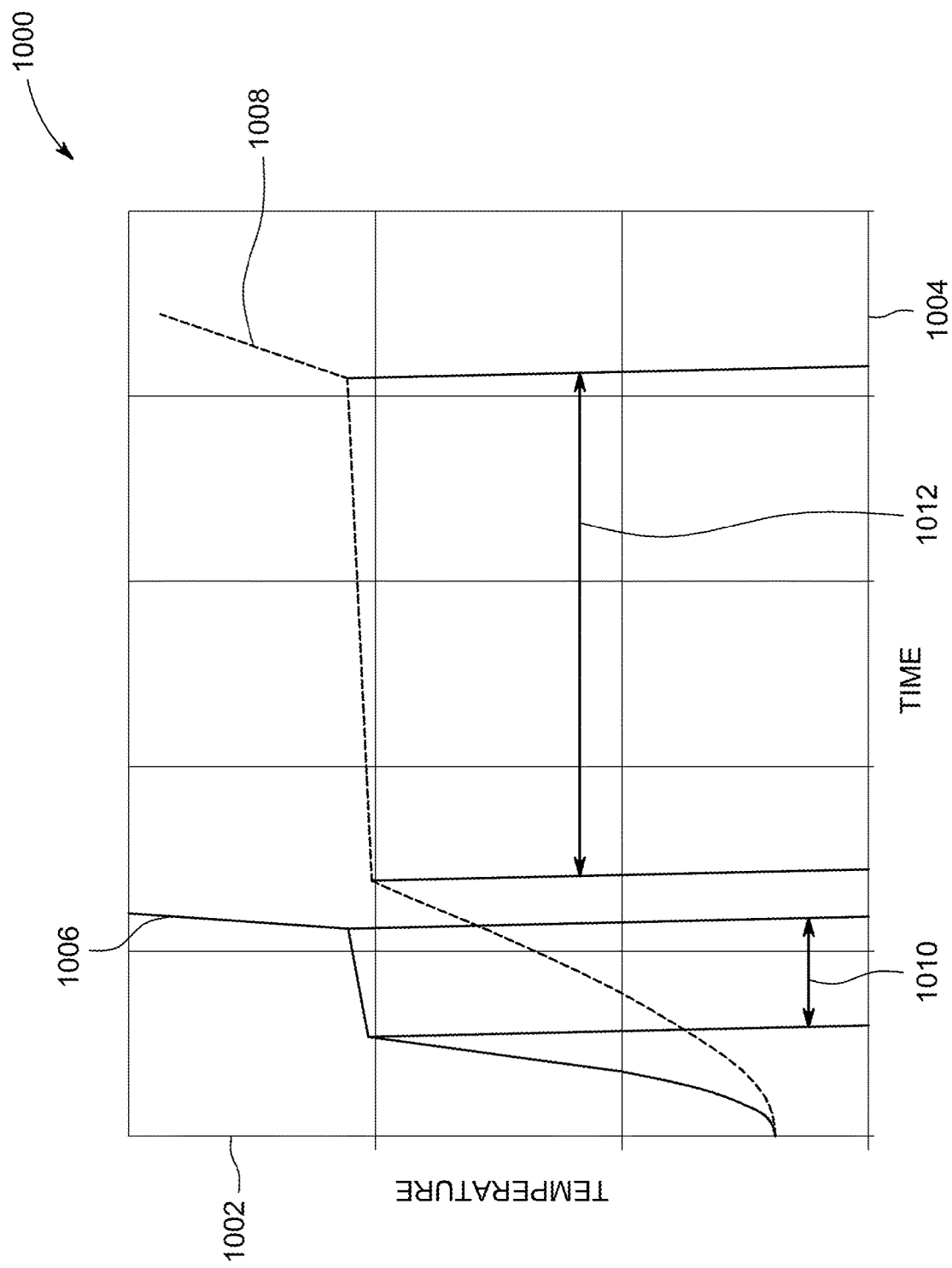
FIG. 10 is a graph of temperature measurements obtain within the infrared imaging device of FIGS. 1, 2, and 3.

FIG. 10 is a graph 1000 of temperatures within infrared imaging device 100 with heat transfer structure 400. Graph 1000 does not apply to infrared imaging device 100 including heat transfer structures 500-900 because heat transfer structures 500-900 do not include a phase change material. Graph 1000 includes a unitless y-axis 1002 which displays temperature and a unitless x-axis 1004 which displays time. A first curve 1006 depicts the temperatures of within infrared imaging device 100 when the temperature of hot gas path 1178 is a first temperature. A second curve 1008 depicts the temperatures of within infrared imaging device 100 when the temperature of hot gas path 1178 is a second temperature. In the exemplary embodiment, the first temperature of hot gas path 1178 is greater than the second temperature of hot gas path 1178.

As first curve 1006 shows, the temperature of infrared imaging device 100 increases when placed in hot gas path 1178. Once the temperature reaches the PCM melting temperature, it remains approximately constant for a first set amount of time 1010. After PCM 106 has completely melted, the temperature of infrared imaging device 100 continues to increase. Similarly, second curve 1008 shows the temperature of infrared imaging device 100 increasing when placed in hot gas path 1178. However, because the first temperature of hot gas path 1178 is greater than the second temperature of hot gas path 1178, second curve 1008 increases at a slower rate than first curve 1006. Once the temperature reaches PCM melting temperature, it remains approximately constant for a second set amount of time 1012. After PCM 106 has completely melted, the temperature of infrared imaging device 100 continues to increase. Second set amount of time 1012 is longer than first set amount of time 1010 because the first temperature of hot gas path 1178 is greater than the second temperature of hot gas path 1178 and PCM 106 takes longer to melt. PCM 106 extends the useful life of electronic components 116 for first and second set amounts of time 1010 and 1012.

In the exemplary embodiment, PCM 106 includes one of an acid melt material, a salt, or a paraffin material. Salts include sodium salts or lithium salts. However, PCM 106 may include any material which enables infrared imaging device 100 to operate as described herein. Selection of PCM 106 material depends on which electronic components 116 are within infrared imaging device 100, the length of set amounts of time 1002 and 1006, the rated operating temperature of electronic components 116, and the PCM melting temperature.

Infrared imaging devices 100, 200, and 300 are used to thermally image hostile environments. One example of a hostile environment is the undercowl of a gas turbine engine shown in FIG. 11. However, infrared imaging devices 100, 200, and 300 are not limited to uses within gas turbine engines. Rather infrared imaging devices 100, 200, and 300 may be used in any hostile environment.

FIG. 11 is a schematic cross-sectional view of a gas turbine engine 1110 in accordance with an exemplary embodiment of the present disclosure. In the exemplary embodiment, gas turbine engine 1110 is a high-bypass turbofan jet engine 1110, referred to herein as "turbofan engine 1110." Turbofan engine 1110 defines an axial direction A (extending parallel to a longitudinal centerline 1112 provided for reference) and a radial direction R. Turbofan engine 1110 includes a fan section 1114 and a core turbine engine 1116 disposed downstream from fan section 1114.

Exemplary core turbine engine 1116 depicted generally includes a substantially tubular outer casing 1118 that defines an annular inlet 1120 and an inner casing 1119 circumscribed by outer casing 1118. Outer casing 1118 and inner casing 1119 define an undercowl cavity 1121 therebetween. Outer casing 1118 encases, in serial flow relationship, a compressor section 1123 including a booster or low pressure (LP) compressor 1122 and a high pressure (HP) compressor 1124; a combustion section 1126; a turbine section including a high pressure (HP) turbine 1128 and a low pressure (LP) turbine 1130; and a jet exhaust nozzle section 1132. A high pressure (HP) shaft or spool 1134 drivingly connects HP turbine 1128 to HP compressor 1124. A low pressure (LP) shaft or spool 1136 drivingly connects LP turbine 1130 to LP compressor 1122. The compressor section 1123, combustion section 1126, turbine section, and nozzle section 1132 together define a core air flowpath 1137. Outer casing 1118 includes a plurality of ports 1139.

In the exemplary embodiment, fan section 1114 includes a variable pitch fan 1138 having a plurality of fan blades 1140 coupled to a disk 1142 in a spaced apart manner. Fan blades 1140 extend outwardly from disk 1142 generally along radial direction R. Each fan blade 1140 is rotatable relative to disk 1142 about a pitch axis P by virtue of fan blades 1140 being operatively coupled to a suitable pitch change mechanism 1144 configured to collectively vary the pitch of fan blades 1140 in unison. Fan blades 1140, disk 1142, and pitch change mechanism 1144 are together rotatable about longitudinal axis 1112 by LP shaft 1136 across a power gear box 1146. Power gear box 1146 includes a plurality of gears for adjusting the rotational speed of fan 1138 relative to LP shaft 1136 to a more efficient rotational fan speed. In an alternative embodiment, fan blade 1140 is a fixed pitch fan blade rather than a variable pitch fan blade.

Also, in the exemplary embodiment, disk 1142 is covered by rotatable front hub 1148 aerodynamically contoured to promote an airflow through plurality of fan blades 1140. Additionally, exemplary fan section 1114 includes an annular fan casing or outer nacelle 1150 that circumferentially surrounds fan 1138 and/or at least a portion of core turbine engine 1116. Nacelle 1150 is configured to be supported relative to core turbine engine 1116 by a plurality of circumferentially-spaced outlet guide vanes 1152. A downstream section 1154 of nacelle 1150 extends over an outer portion of core turbine engine 1116 so as to define a bypass airflow passage 1156 therebetween.

During operation of turbofan engine 1110, a volume of air 1158 enters turbofan engine 1110 through an associated inlet 1160 of nacelle 1150 and/or fan section 1114. As volume of air 1158 passes across fan blades 1140, a first portion of air 1158 as indicated by arrows 1162 is directed or routed into bypass airflow passage 1156 and a second portion of air 1158 as indicated by arrow 1164 is directed or routed into core air flowpath 1137, or more specifically, into LP compressor 1122. The ratio between first portion of air 1162 and second portion of air 1164 is commonly known as a bypass ratio. The pressure of second portion of air 1164 is then increased as it is routed through HP compressor 1124 and into combustion section 1126, where it is mixed with fuel and burned to provide combustion gases 1166.

Combustion gases 1166 are routed through HP turbine 1128 where a portion of thermal and/or kinetic energy from combustion gases 1166 is extracted via sequential stages of HP turbine stator vanes 1168 that are coupled to outer casing 1118 and HP turbine rotor blades 1170 that are coupled to HP shaft or spool 1134, thus causing HP shaft or spool 1134 to rotate, thereby supporting operation of HP compressor 1124. Combustion gases 1166 are then routed through LP turbine 1130 where a second portion of thermal and kinetic energy is extracted from combustion gases 1166 via sequential stages of LP turbine stator vanes 1172 that are coupled to outer casing 1118 and LP turbine rotor blades 1174 that are coupled to LP shaft or spool 1136, thus causing LP shaft or spool 1136 to rotate which causes power gear box 1146 to rotate LP compressor 1122 and/or rotation of fan 1138.

Combustion gases 1166 are subsequently routed through jet exhaust nozzle section 1132 of core turbine engine 1116 to provide propulsive thrust. Simultaneously, the pressure of first portion of air 1162 is substantially increased as first portion of air 1162 is routed through bypass airflow passage 1156 before it is exhausted from a fan nozzle exhaust section 1176 of turbofan engine 1110, also providing propulsive thrust. HP turbine 1128, LP turbine 1130, and jet exhaust nozzle section 1132 at least partially define a hot gas path or hostile environment 1178 for routing combustion gases 1166 through core turbine engine 1116.

In an exemplary embodiment, a plurality of infrared imaging devices 1180 positioned within ports 1139 to record thermal images within undercowl cavity 1121 during flight. Undercowl cavity 1121 includes a plurality of electronic devices 1181. Combustion gases 1166 radiate heat to electronic devices 1181 within undercowl cavity 1121. In some cases, the heat radiated from Combustion gases 1166 raises the temperature of the electronic components above the electronic devices' 1181 rated operating temperature. PCM 106 and heat transfer structures 400-900 protect electronic components 116 during a portion of the flight time. Infrared imaging devices 1180 wirelessly communicate thermal images through communication module 122. In another embodiment, infrared imaging devices 1180 are recovered after the flight. Communications module 204 transfers thermal images to data collection module 206 through data transfer device 208. In yet another embodiment, infrared imaging devices 1180 are configured in a network 1200 (see FIG. 12) and image the entire undercowl cavity 1121.

Exemplary turbofan engine 1110 depicted in FIG. 11 is by way of example only, and that in other embodiments, turbofan engine 1110 may have any other suitable configuration. In still other embodiments, aspects of the present disclosure may be incorporated into any other suitable gas turbine engine. For example, in other embodiments, aspects of the present disclosure may be incorporated into, e.g., a turboprop engine.

In the exemplary embodiments, the capital cost of infrared imaging device 1180 is lower than traditional permanently installed monitoring systems. Additionally, gas turbine engine 1110 can be monitored and imaged during operation, rather than testing and monitoring gas turbine engine 1110 on the ground and requiring substantial down time. Thus, infrared imaging devices 1180 provide a cost effective device for thermally imaging gas turbine engine 1110 during operation.

Figure 12:
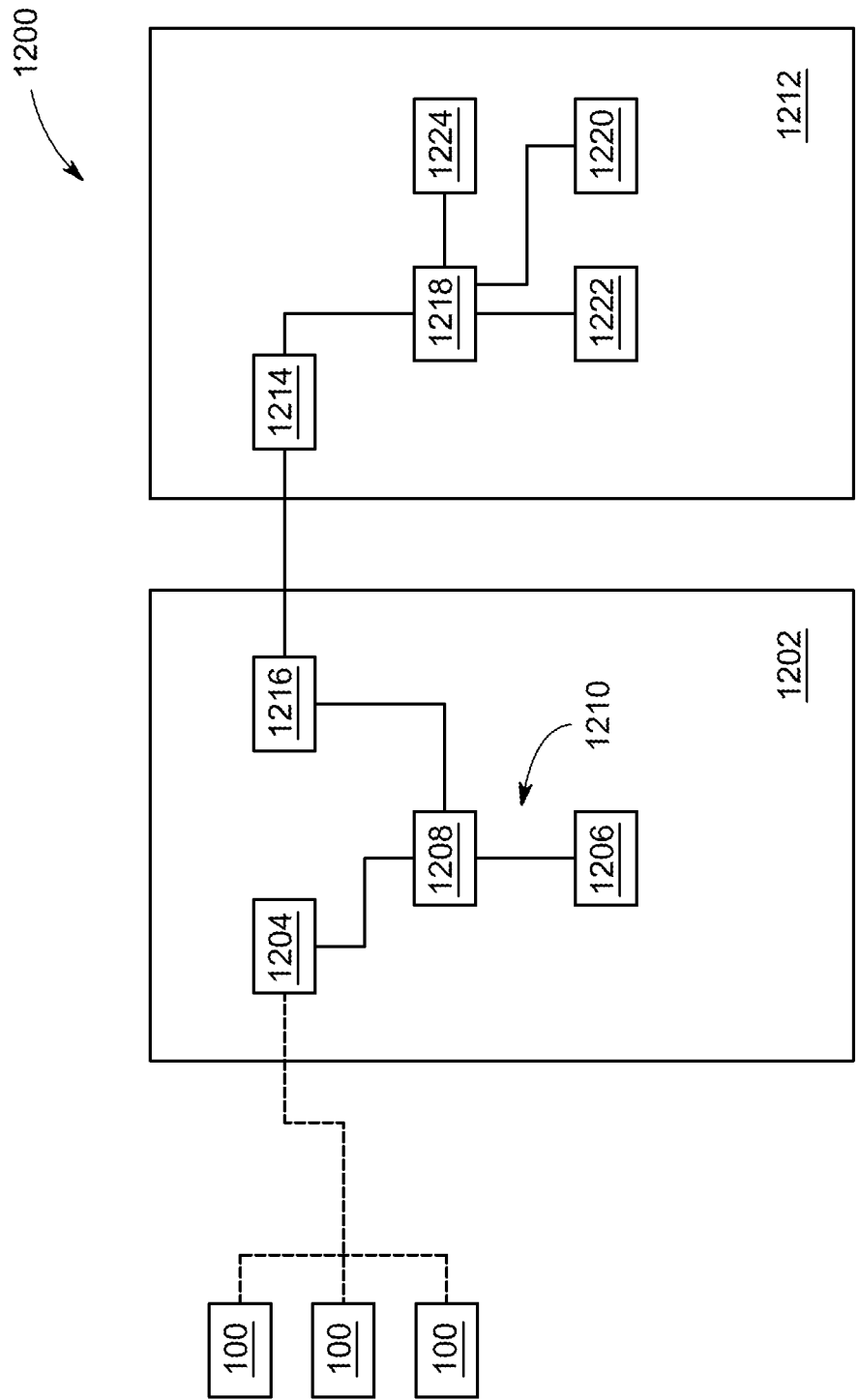
FIG. 12 is a schematic view of a micro thermal imaging system used with the turbine engine of FIG. 11.

FIG. 12 is a schematic view of a micro thermal imaging system 1200 used with turbine engine 1110 (shown in FIG. 11). In the exemplary embodiment, micro thermal imaging system 1200, also described herein as network 1200, includes a controller 1202 that is wirelessly coupled to each infrared imaging device 100, and, more particularly, to communications module 122 of each infrared imaging device 100. More specifically, controller 1202 includes a device interface 1204, also described herein as a receiver, and each infrared imaging device 100 is coupled to interface 1204 via a wireless connection, such as a short-range wireless communication channel such as BLUETOOTH®. BLUETOOTH is a registered trademark of Bluetooth SIG, Inc. of Kirkland, Wash. Various other connections may also be available between device interface 1204 and infrared imaging devices 100. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers)(IEEE®) 1394, a parallel data connection, such as IEEE® 1284 or IEEE® 488, and/or a private (e.g., an inaccessible outside power generation system) network connection, whether wired or wireless. IEEE is a registered trademark of the Institute of Electrical and Electronics Engineers, Inc., of New York, N.Y.

In the exemplary embodiment, each infrared imaging device 100 transmits a signal corresponding to an operating parameter to controller 1202, such as a temperature value or values detected by infrared imaging device 100 for the respective region in view of infrared imaging device 100. Moreover, each infrared imaging device 100 may transmit a signal continuously, periodically, or only once, for example. Other signal timings may also be contemplated. Furthermore, each infrared imaging device 100 may transmit a signal either in an analog form or in a digital form. In alternative embodiments, other sensors (not shown) within turbine engine 100 transmit signals of other operating parameters, such as but not limited to pressure, to controller 1202.

Further, in the exemplary embodiment, controller 1202 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 1202 may be a microprocessor that includes read-only memory (ROM) and/or random access memory (RAM), such as, for example, a 32 bit microcomputer with 2 Mbit ROM and 64 Kbit RAM.

In the exemplary embodiment, controller 1202 also includes a memory device 1206 that stores executable instructions and/or one or more operating parameters representing and/or indicating an operating condition of turbine engine 100. For example, in the exemplary embodiment, memory device 1206 stores the temperature data that is detected by infrared imaging devices 100. In the exemplary embodiment, controller 1202 also includes a processor 1208 that is coupled to memory device 1206 and device interface 1204 via a system bus 1210.

In one embodiment, processor 1208 may include a processing unit, such as, without limitation, an integrated circuit (IC), an application specific integrated circuit (ASIC), a microcomputer, a programmable logic controller (PLC), and/or any other programmable circuit. Alternatively, processor 1208 may include multiple processing units (e.g., in a multi-core configuration). The above examples are exemplary only, and thus are not intended to limit in any way the definition and/or meaning of the term "processor."

In the exemplary embodiment, control system 160 also includes a user computing device 1212 that is coupled to controller 1202. More specifically, user computing device 1212 includes a communication interface 1214 that is coupled to a communication interface 1216 contained within controller 1202. User computing device 1212 includes a processor 1218 for executing instructions. In some embodiments, executable instructions are stored in a memory device 1220. Processor 1218 may include one or more processing units (e.g., in a multi-core configuration). Memory device 1220 is any device allowing information, such as executable instructions and/or other data, to be stored and retrieved.

User computing device 1212 also includes at least one media output component 1222 for use in presenting information to a user (not shown). Media output component 1222 is any component capable of conveying information to the user. Media output component 1222 may include, without limitation, a display device (e.g., a liquid crystal display (LCD), an organic light emitting diode (OLED) display, or an audio output device (e.g., a speaker or headphones)).

Moreover, in the exemplary embodiment, user computing device 1212 includes an input interface 1224 for receiving input from the user. In some embodiments, input interface 1224 includes, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of media output component 1222 and input interface 1224.

The above-described embodiments provide an efficient system for thermally imaging a turbomachine. Specifically, in the exemplary embodiment, the infrared imaging device includes a phase change material and a heat transfer structure. The PCM and the heat transfer structure protect the electronic components within the infrared imaging device by absorbing heat from the hostile environment. The PCM and the heat transfer structure extend the useful life of the electronic components by maintaining the temperature of the electronic components below the rated operating temperature of the electronic components while absorbing heat from the hostile environment. The infrared imaging device of the present disclosure allows for thermal imaging of the hostile environment without prolonged downtime of the turbomachinery housing the hostile environment. As such, the infrared imaging device of the present disclosure provides a more cost effective method to thermally image a turbomachine.

An exemplary technical effect of the systems and methods described herein includes at least one of: (a) taking thermal images within a hostile environment; (b) maintaining a temperature of electronic components within an infrared imaging device below a rated operating temperature; (c) absorbing heat from a hostile environment with a phase change material by melting the phase change material; (d) absorbing heat from a hostile environment with a heat transfer structure; (e) networking multiple infrared imaging devices to take thermal images of the entire undercowl cavity; and (f) extending the useful life of electronic components within an infrared imaging device.

Exemplary embodiments of systems and methods for an infrared imaging device are described above in detail. The methods and systems are not limited to the specific embodiments described herein, but rather, components of systems and/or steps of the methods may be utilized independently and separately from other components and/or steps described herein. For example, the method may also be used in combination with other imaging devices, and are not limited to practice only with the infrared imaging device as described herein. Rather, the exemplary embodiment can be implemented and utilized in connection with many other imaging devices.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An infrared imaging device comprising:
   a case;
   a plurality of electronic components configured to collect data, said plurality of electronic components having a predetermined temperature parameter, said plurality of electronic components disposed within said case;
   a heat transfer structure disposed within said case, said heat transfer structure configured to conduct heat away from said plurality of electronic components, wherein said heat transfer structure is further configured to regulate a temperature of said electronic components below the predetermined temperature parameter;
   an insulation material positioned within the case;
   a phase change material that is disposed within the insulation material and wherein the plurality of electronic components are disposed within said phase change material, said phase change material having a first material phase and a second material phase, said phase change material configured to absorb heat through changing from the first material phase to the second material phase.

2. The infrared imaging device in accordance with claim 1, wherein said heat transfer structure comprises a heat pipe and a plurality of fins coupled to said heat pipe.

3. The infrared imaging device in accordance with claim 2, wherein said heat pipe extends through said casing.

4. The infrared imaging device in accordance with claim 1, wherein said phase change material comprises one or more of a paraffin, a salt, and an acid melt material.

5. The infrared imaging device in accordance with claim 1, wherein said heat transfer structure is disposed within said phase change material, said heat transfer structure configured to conduct heat within said phase change material.

6. The infrared imaging device in accordance with claim 1, wherein said heat transfer structure comprises a cooler configured to cool said plurality of electronic components with a cooling fluid.

7. The infrared imaging device in accordance with claim 6 further comprising a plurality of fins coupled to said plurality of electronic components, said plurality of fins extending into said cooler, wherein said plurality of fins is configured to conduct heat away from said plurality of electronic components and into the cooling fluid.

8. The infrared imaging device in accordance with claim 7 further comprising a nozzle configured to spray the cooling fluid on said plurality of fins.

9. The infrared imaging device in accordance with claim 1, wherein said infrared imaging device has a mass, the mass of said infrared imaging device includes values in a range from and including about 10 grams to and including about 250 grams.

10. An engine comprising:
a first casing;
a second casing circumscribing said first casing, said second casing defining at least one port, said first casing and said second casing defining an undercowl cavity; and
an infrared imaging device positioned within said at least one port, said infrared imaging device configured to collect data from said undercowl cavity, said infrared imaging device comprising:
a case;
a plurality of electronic components configured to collect data, said plurality of electronic components having a predetermined temperature parameter, said plurality of electronic components disposed within said case;
a heat transfer structure disposed within said case, said heat transfer structure configured to conduct heat away from said plurality of electronic components, wherein said heat transfer structure is further configured to regulate a temperature of said electronic components below the predetermined temperature parameter; and
an insulation material positioned within the case;
a phase change material that is disposed within the insulation material and wherein the plurality of electronic components are disposed within said phase change material, said phase change material having a first material phase and a second material phase, said phase change material configured to absorb heat through changing from the first material phase to the second material phase.

11. The engine in accordance with claim 10, wherein said heat transfer structure comprises a heat pipe and a plurality of fins coupled to said heat pipe.

12. The engine in accordance with claim 11, wherein said heat pipe extends through said casing and said second casing.

13. The engine in accordance with claim 12 further comprising a nacelle circumscribing said second casing, said nacelle and said second casing defining a bypass airflow passage, said heat pipe extends into the bypass airflow passage.

14. The engine in accordance with claim 10, wherein said phase change material comprises at least one of a paraffin, a salt, or an acid melt material.

15. The engine in accordance with claim 10, wherein said heat transfer structure comprises a cooler configured to cool said plurality of electronic components with a cooling fluid.

16. An engine comprising:
a first casing;
a second casing circumscribing said first casing, said second casing defining a plurality of ports, said first casing and said second casing defining an undercowl cavity; and
a network of infrared imaging devices comprising a plurality of infrared imaging devices, said plurality of infrared imaging devices coupled in data transfer communication forming said network of infrared imaging devices, each infrared imaging device of said plurality of infrared imaging devices positioned within a port of said plurality of ports, said each infrared imaging device configured to collect data from said undercowl cavity, said each infrared imaging device comprising:
a case;
a plurality of electronic components configured to collect data, said plurality of electronic components having a predetermined temperature parameter, said plurality of electronic components disposed within said case;
a heat transfer structure disposed within said case, said heat transfer structure configured to conduct heat away from said plurality of electronic components, wherein said heat transfer structure is further configured to regulate a temperature of said electronic components below the predetermined temperature parameter; and
an insulation material positioned within the case;
a phase change material that is disposed within the insulation material and wherein the plurality of electronic components are disposed within said phase change material, said phase change material having a first material phase and a second material phase, said phase change material configured to absorb heat through changing from the first material phase to the second material phase.

17. The engine in accordance with claim 16, wherein said network of infrared imaging devices further comprises a controller configured to control said plurality of infrared imaging devices.

18. The engine in accordance with claim 17, wherein said plurality of infrared imaging devices are coupled in wireless data transfer communication with said controller.

* * * * *